(12) United States Patent
Shamma et al.

(10) Patent No.: US 10,409,857 B2
(45) Date of Patent: Sep. 10, 2019

(54) METHOD AND SYSTEM OF GENERATING AND USING A GEOGRAPHICAL HIERARCHY MODEL

(71) Applicant: OATH INC., New York, NY (US)

(72) Inventors: David Ayman Shamma, San Francisco, CA (US); Mohamed Kafsi, Lausanne (CH); Henriette Cramer, San Francisco, CA (US)

(73) Assignee: OATH INC., New York, NY (US)

( * ) Notice: Subject to any disclaimer, the term of this patent is extended or adjusted under 35 U.S.C. 154(b) by 738 days.

(21) Appl. No.: 14/445,724

(22) Filed: Jul. 29, 2014

(65) Prior Publication Data

US 2016/0034564 A1 Feb. 4, 2016

(51) Int. Cl.
*G06F 16/58* (2019.01)
*G06F 16/9537* (2019.01)

(52) U.S. Cl.
CPC ...... *G06F 16/5866* (2019.01); *G06F 16/9537* (2019.01)

(58) Field of Classification Search
CPC ........... G06F 17/3087; G06F 17/30268; G06F 17/30643; G06F 17/30864; G06F 17/30997; G06F 17/30241; G06F 17/30424; G06F 17/3053; G06F 17/30554; G06F 17/30038; G06F 17/30873; G06F 16/29; G06F 16/9537; G06F 16/3323; G06F 16/3346; G06F 16/35; G06F 16/954; G06F 16/5866; G06F 16/9027
USPC .............. 706/58; 707/752, E17.018, E17.11, 707/E17.014, 999.107, E17.059, 736, 766, 707/778, E17.067, E17.111, E17.095, 707/724, 803, 919; 700/224, 226
See application file for complete search history.

(56) References Cited

U.S. PATENT DOCUMENTS

| 8,626,699 B2 * | 1/2014 | Xie | ........................... G06N 5/02 706/58 |
| 2010/0171763 A1 * | 7/2010 | Bhatt | .................. G06F 16/9537 345/660 |

OTHER PUBLICATIONS

Ahern, S., Naaman, M., Nair, R., and Yang, J. H.-I. World explorer: visualizing aggregate data from unstructured text in geo-referenced collections. In Proceedings of Digital Libraries, ACM Press (2007), 1-10.

Ahmed, A.,Hong,L. and Smola, A. J. Hierarchical geographical modeling of user locations from social media posts. In Proceedings of WWW 2013 (2013).

Bentley, F., Cramer, H., Basapur, S., and Hamilton, W. Drawing the city. differing perceptions of the urban environment. In Proceedings of CHI 2012, ACM Press (2012).

Bentley, F., Cramer, H., and Muller, J. Beyond the bar: the place where location-based services are used in the city. Journal of Personal and Ubiquitous Computing Mar. 2014.

Bishop, C. M. Pattern Recognition and Machine Learning (Information Science and Statistics). Springer-Verlag New York, Inc., Secaucus, NJ, USA, 2006.

(Continued)

*Primary Examiner* — Arpan P. Savla
*Assistant Examiner* — Cecile H Vo
(74) *Attorney, Agent, or Firm* — James J. DeCarlo; Greenberg Traurig, LLP

(57) ABSTRACT

Geographical regions are each characterized using a distribution of terms, tags, etc. A model may be generated that identifies characteristics of each geographic region. The geographic regions may be organized using a geographical hierarchical model.

46 Claims, 8 Drawing Sheets

(56) References Cited

OTHER PUBLICATIONS

Blei, D. M., Griffiths, T. L., Jordan, M. I., and Tenenbaum, J. B. Hierarchical topic models and the nested chinese restaurant process. In NIPS, S. Thrun, L. K. Saul, and B. Scholkopf, Eds., MIT Press (2003).

Blei, D. M., Ng, A. Y., and Jordan, M. I. Latent dirichlet allocation. J. Mach. Learn. Res. 3 (Mar. 2003), 993-1022.

Crandall, D. J., Backstrom, L., Huttenlocher, D., and Kleinberg, J. Mapping the world's photos. In Proceedings of WWW 2009, ACM Press (New York, NY, USA, 2009), 761-770.

Cranshaw, J., Schwartz, R., Hong, J. I., and Sadeh, N. M. The livehoods project: utilizing social media to understand the dynamics of a city. In Proceedings of ICWSM 2012, AAAI (Dublin, Ireland, 2012).

Davies, C., Holt, I., Green, J., Harding, J., and Diamond, L. User needs and implications for modelling vague named places. Spatial Cognition & Computation 9,3 (2009), 174-194.

Doersch, C., Singh, S., Gupta, A., Sivic, J., and Efros, A. What makes paris look like paris? In ACM Transactions on Graphics (SIGGRAPH 2012) (2012).

Egenhofer, M. J., and Mark, D. M. Naive geography. Springer, 1995.

Grinberg, N., Naaman, M., Shaw, B., and Lotan, G. Extracting diurnal patterns of real world activity from social media. In ICWSM (2013).

Hofmann, T. The cluster-abstraction model: Unsupervised learning of topic hierarchies from text data. In Proceedings of IJCAI'99, Morgan Kaufmann (San Francisco, CA, USA, 1999), 682-687.

Hollenstein, L., and Purves, R. Exploring place through user-generated content: Using flickr tags to describe city cores. Journal of Spatial Information Science, 1 (2010), 21-48.

Long, X., Jin, L., and Joshi, J. Exploring trajectory-driven local geographic topics in foursquare. In Proceedings of UbiComp 2012, ACM Press (2012).

Marlow, C., Naaman, M., danah boyd, and Davis, M. Ht06, tagging paper, taxonomy, flickr, academic article, to read. In Proceedings of HYPERTEXT '06, ACM PRESS (New York, NY, USA, 2006), 31-40.

Montello, D. R., Goodchild, M. F., Gottsegen, J., and Fohl, P. Where's downtown?: Behavioral methods for determining referents of vague spatial queries. Spatial Cognition & Computation 3,2-3 (2003), 185-204.

Naaman, M., and Nair, R. Zonetag's collaborative tag suggestions: What is this person doing in my phone? IEEE MultiMedia 15, 3 (2008).

Quercia, D., Cramer, H., and OHare, N. Aesthetic capital: What makes london look beautiful, quiet, and happy. In Proceedings of CSCW2014 (2014).

Rattenbury, T., and Naaman, M. Methods for extracting place semantics from flickr tags. ACM Transactions on the Web (TWEB) 3, 1 (2009), 1.

Rost, M., Barkhuus, L., Cramer, H., and Brown, B. Representation and communication: Challenges in interpreting large social media datasets. In Proceedings of CSCW'13, ACM Press (2011).

Salton, G., Wong, A., and Yang, C. S. A vector space model for automatic indexing. Commun. ACM 18 (1975), 613-620.

Shamma, A., Kennedy, L., and Churchill, E. Peaks and persistence: Modeling the shape of microblog conversations. In Proceedings CSCW2011, ACM Press (2011).

Thomee, B., and Rae, A. Uncovering locally characterizing regions within geotagged data. In Proceedings of WWW 2013 (2013), 1285-1296.

Toutanova, K., Chen, F., Popat, K, and Hofmann, T. Text classification in a hierarchical mixture model for small training sets. In Proceedings of CIKM 2001, ACM (New York, NY, USA, 2001), 105-113.

Van Laere, O., Quinn, J., Schockaert, S., and Dhoedt, B. Spatially aware term selection for geotagging. IEEE Transactions on Knowledge and Data Engineering 26, 1 (2014), 221-234.

Van Laere, O., Steven Schockaert, S., and Dhoedt, B. Georeferencing flickr photos using language models at different levels of granularity: an evidence based approach. Information Sciences 238, Apr. 2012, 52-74.

Shamma, et al; Beyond 'there': Finding Locally Characteristic Content Using a Geographical Hierarchical Approach; 11 pages.

* cited by examiner

| Mission | GG Park | Battery Park | Midtown |
|---|---|---|---|
| California ‡ | California ‡ | New York ‡ | New York ‡ |
| Mission * | Flower * | Manhattan ‡ | Manhattan ‡ |
| SF ‡ | Park * | USA † | USA † |
| USA † | SF ‡ | WTC | Midtown * |
| Graffiti * | USA † | Brooklyn | Skyscraper * |
| Art * | Museum * | Downtown | Time square * |
| Mural * | Tree * | Bridge | *Light* † |
| Valencia * | GG Park * | Gotham ‡ | Moma * |
| Food * | De Young * | Memorial | Broadway * |
| Car ‡ | Architecture ‡ | *Light* † | Rockefeller * |

FIGURE 3

```
                            ┌─ 400
                            │
402                        
  ╲   woeid 12589233 <~> node (23424977, 2347367, 1258923)
      lasvegas, locality: 0.985 ─┐
      nevada, locality: 0.094       ╲               ~~~~~~~~> lasvegas
      vegas, locality: 0.949         404            ~~~~~~~~> vegas
      las, locality: 0.853                          ~~~~~~~~> las
      usa, locality: 0.612                          ~~~~~~~~> usa
      casino, locality: 0.595                       ~~~~~~~~> casino
      hotel, locality: 0.521                        ~~~~~~~~> hotel
      bellagio, locality: 0.606                     ~~~~~~~~> bellagio
      night, locality: 0.514                        --------> night
      paris, locality: 0.382                        --------> paris
      strip, locality: 0.875                        --------> strip
      desert, locality: 0.063
      hooverdam, locality: 0.352
      venetian, locality: 0.94                      --------> venetian
      water, locality: 0.362
      lights, locality: 0.648                       --------> lights
      luxor, locality: 0.309                        --------> luxor
      thestrip, locality: 0.341                     --------> thestrip
      fountain, locality: 0.741                     --------> fountain
      sign, locality: 0.244
      arizona, locality: 0.815                      --------> arizona
      caesarspalace, locality: 0.985                --------> caesarspalace
      dam, locality: 0.733                          --------> dam
      nv, locality: 0.196
      neon, locality: 0.579                         --------> neon
      red, locality: 0.39                           --------> red
      unitedstates, locality: 0.268
      sky, locality: 0.063
      newyorknewyork, locality: 0.985               --------> newyorknewyork
406   wynn, locality: 0.913                         --------> wynn
  ╲   travel, locality: 0.379
      sunset, locality: 0.045 ─┐
      hoover, locality: 0.982   408                 --------> hoover
      lake, locality: 0.051
      mirage, locality: 0.716                       --------> mirage
      blue, locality: 0.151
      statue, locality: 0.637                       --------> statue
```

FIGURE 4

| San Francisco | Manhattan | Top common tags |
|---|---|---|
| Mission | East Village (0.23) | Graffiti, food, restaurant, mural, bar |
| GG Park | Washington Heights (0.26), Upper West Side (0.22) | Park, museum, nature, flower, bird |
| Financial District | Battery Park (0.29), Midtown Manhattan (0.27) | Downtown, building, skyscraper, city, street |
| Treasure Island | Roosevelt Island (0.38) | Bridge, island, water, skyline, boat |
| Chinatown | Chinatown (0.85) | Chinatown, Chinese, downtown, dragons, lantern |
| Castro | West Village (0.06) | Park, gay, Halloween, pride, bar |

FIGURE 5

METHOD AND SYSTEM OF GENERATING AND USING A GEOGRAPHICAL HIERARCHY MODEL

FIELD OF THE DISCLOSURE

The present disclosure relates to characterizing a geographical region, such as a neighborhood, using one or more tags, and relates to generating a model identifying characteristics of geographic regions, which regions may be organized using a geographical hierarchy.

BACKGROUND

People are interested in obtaining knowledge, or information, about a geographic locale, or locales. Information about a geographic locale may be possessed by people familiar with a geographic locale; however, many times such people are not familiar with one or more aspects of a locale. Additionally and before such information about a geographic locale may be obtained, the people familiar with the geographic locale must be identified and/or willing to provide the information.

SUMMARY

The present disclosure seeks to address failings in the art and to provide a probabilistic model, e.g., a probabilistic hierarchical model, characterizing a plurality of geographic regions. In accordance with one or more embodiments, each geographic regions has an associated probability distribution comprising a likelihood, for each semantic construct in a vocabulary, that the semantic construct is descriptive of the geographic region. By way of some non-limiting examples, a semantic construct might be a word, a phrase, term, etc. By way of a further non-limiting example, a vocabulary may comprise a set of terms, each of which has corresponding geographic location information such as Global Positioning System (GPS) coordinates. As yet a further non-limiting example, the set of terms may be associated with a set of photographs, each photograph having associated geographic location information.

By way of some non-limiting examples, a geographic hierarchical model generated in accordance with one or more embodiments may be used to identify one or more unique geographic regions, e.g., one or more unique neighborhoods, two or more similar geographic regions, etc. The geographical model may identify one or more terms that are descriptive of a given geographic region. The model may be used to identify a geographic location for a content item having one or more terms of the vocabulary of the geographic model, and/or an object depicting by a content item. The model may be used to identify a locality for a search comprising one or more terms of the vocabulary.

In accordance with one or more embodiments, a method is provided, the method comprising determining, by one or more processing units, a plurality of probability distributions, each probability distribution of the plurality corresponding to a geographic region of a plurality of geographic regions, each region of the plurality is associated with a level of a geographic region hierarchy, the geographic region's probability distribution comprising, for each tag of a plurality of tags, a probability that the tag is descriptive of the geographic region, the plurality of probability distributions being used to identify the level of the geographic region hierarchy to assign the tag; receiving, by the one or more processing units, a request to identify at least one geographic region of the plurality of geographic regions; and using, by the one or more processing units, at least some of the plurality of probability distributions to identify the at least one geographic region of the plurality for a response to the request.

In accordance with one or more embodiments a system is provided, which system comprises at least one computing device comprising one or more processors to execute and memory to store instructions to determine a plurality of probability distributions, each (probability distribution of the plurality corresponding to a geographic region of a plurality of geographic regions, each region of the plurality is associated with a level of a geographic region hierarchy, the geographic region's probability distribution comprising, for each tag of a plurality of tags, a probability that the tag is descriptive of the geographic region, the plurality of probability distributions being used to identify the level of the geographic region hierarchy to assign the tag; receive a request to identify at least one geographic region of the plurality of geographic regions; and use at least some of the plurality of probability distributions to identify the at least one geographic region of the plurality for a response to the request.

In accordance with yet another aspect of the disclosure, a computer readable non-transitory storage medium is provided, the medium for tangibly storing thereon computer readable instructions that when executed cause at least one processor to determine a plurality of probability distributions, each probability distribution of the plurality corresponding to a geographic region of a plurality of geographic regions, each region of the plurality is associated with a level of a geographic region hierarchy, the geographic region's probability distribution comprising, for each tag of a plurality of tags, a probability that the tag is descriptive of the geographic region, the plurality of probability distributions being used to identify the level of the geographic region hierarchy to assign the tag; receive a request to identify at least one geographic region of the plurality of geographic regions; and use at least some of the plurality of probability distributions to identify the at least one geographic region of the plurality for a response to the request.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a geographical hierarchy in accordance with one or more embodiments of the present disclosure.

FIG. 2 provides examples of components for use in accordance with one or more embodiments of the present disclosure.

FIG. 3 provides some examples of tags for San Francisco and Manhattan neighborhoods determined in accordance with one or more embodiments of the present disclosure.

FIG. 4 provides an example of tags and associated locality measures corresponding to a node in accordance with one or more embodiments of the present disclosure.

FIG. 5 provides examples of San Francisco neighborhoods and a respective most similar neighborhood for each in Manhattan in accordance with one or more embodiments of the present disclosure.

FIG. 6 provides a process flow example in accordance with one or more embodiments of the present disclosure.

DETAILED DESCRIPTION

Figure 1:
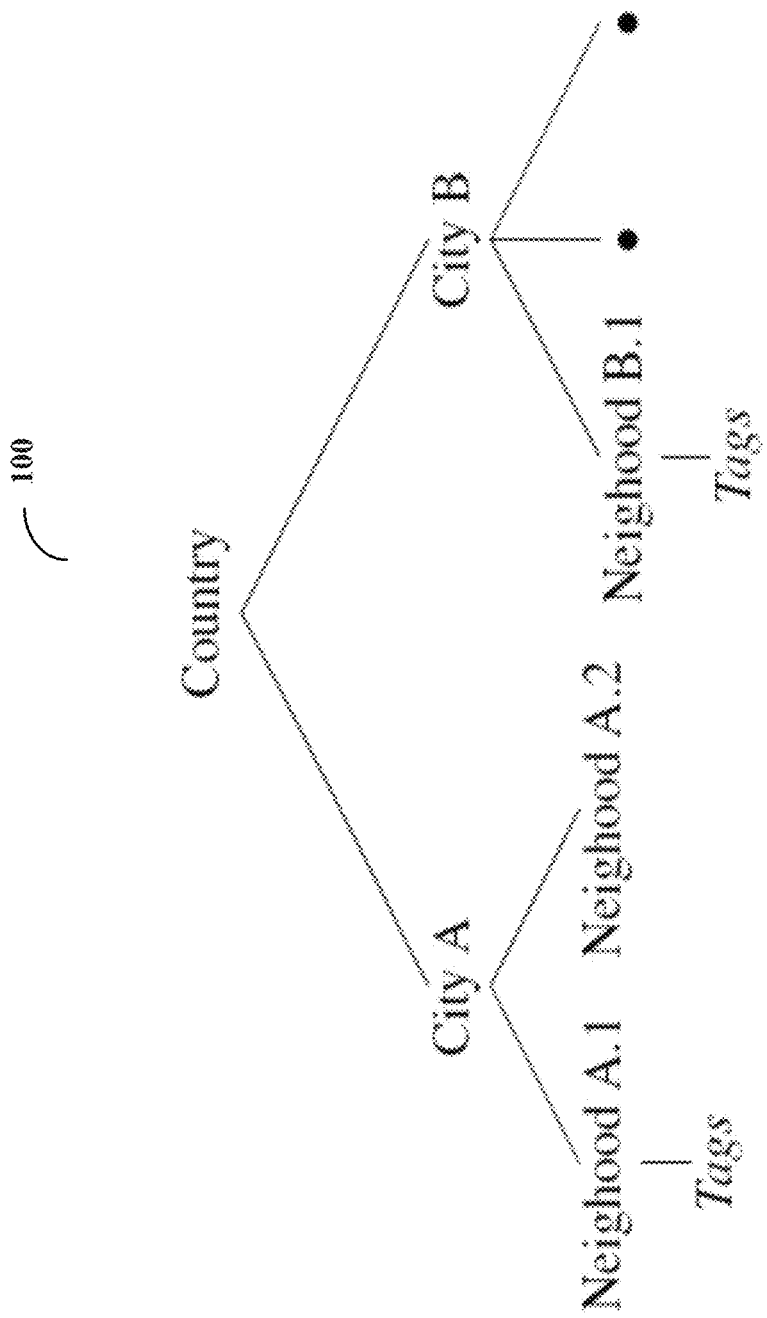

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construe, as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

While one or more embodiments of the present disclosure may be described in connection with photographs, or digital images or media items of any kind, it should be apparent that any type of content item may be used, including without limitation, audio, video, audiovisual, streaming and multimedia content, social media interactions, location "check-ins", or other content items or interaction data. A location "check-in" might comprise one or more items of information about the geographic location, such as information identifying a business at the location, an activity, or activities, at the location, etc. For example, a "check-in" associated with a given geographic location such as "1 am at Joe's Diner" includes information that the geographic location is associated with a restaurant and activities such as eating and drinking may be associated with the geographic location. A photo may refer to a digital still image taken by an image capture device, such as a digital still or video camera, which device may be a component of another device, such as a smartphone, personal data assistant, tablet, laptop, desktop computing device.

Embodiments of the present disclosure provide a geographical hierarchy model (GHM), which comprises a probabilistic hierarchical model that enables the identification of features, such as and without limitation tags, which are specifically descriptive of a given level of a geographical hierarchy and a given region within a given geographic hierarchy. In accordance with one or more embodiments, the GHM may take into account a mutual influence between geographic regions, e.g., geographic regions sharing common boundaries, which model may be referred to herein as a geographical hierarchical model with adjacency (GHMA). Unless otherwise indicated, terms such as model and geographic model used herein refer to either one or the other or both of a GHM and a GHMA.

The following provides a discussion of some terminology which may be used in describing embodiments of the present disclosure. In general terms, a geographic hierarchy may be used to refer to a hierarchy of geographic region, or geographical region types. By way of a nonlimiting example, a geographic hierarchy might refer to such types as a neighborhood, a city, a country, etc. Using this example of geographic region types, a geographic hierarchy formed from such geographic region types may have a leaf node level corresponding to a neighborhood, a root level corresponding to a country, and an intermediate level between the leaf and root node levels corresponding to a city. While the example is one in which the geographic hierarchy has three levels, it should be apparent that a geographic hierarchy may comprise greater or fewer levels. For example, the example geographical hierarchy might include a state level.

A geographic hierarchy may be represented as follows:

Root→Intermediate Level(s)→Leaf

In the example used above, the geographic hierarchy may be represented as follows:

Country→City→Neighborhood

Herein, the term tag may be used to represent any semantic construct, e.g., such as a word, term, phrase, etc., of a vocabulary. While tag is used herein to refer to a component of a vocabulary, it should be apparent that any vocabulary and or vocabulary construct may be used in connection with embodiments of the present disclosure.

While one or more embodiments of the present disclosure are described in connection with a tag as a semantic construct of a vocabulary, other constructs may also be used, including and without limitation such concepts as colors, moods, etc.

A semantic construct, e.g., a tag, may be generically referenced herein as, t, and a vocabulary, or collection of tags may be referenced as M, where M may also refer to a number of tags of the vocabulary. In accordance with one or more embodiments, a vocabulary may be defined by the tags provided as input to a model generator, or model generation process.

A neighborhood may be used herein to refer to a basic spatial unit, e.g., a lowest level of a geographic hierarchy. It should be apparent that another geographic region, e.g., a sub-neighborhood region, may be used as the lowest level of a geographic hierarchy. A neighborhood may be generically referenced herein as n, and a collection of neighborhoods may be referenced as N, where N may also refer to a number of neighborhoods in the collection, set, or geographical model. Using the above example, a neighborhood may be geographically located within a city, which is geographically located within a country.

A semantic representation of a neighborhood may be based on a list of tags associated with the neighborhood. By way of a non-limiting example, the list of tags may be a list of tags associated with a set of photos, e.g., photos that each have an associated geographic location, which location may be expressed using GPS coordinates. Each neighborhood, n, may have an associated vector, $x_n \in \mathbb{N}^M$, where $x_{nt}$ represents the number of times tag t is observed in neighborhood n.

A geographical hierarchy may be represented using a tree structure, or tree. FIG. 1 provides an example of a geographical hierarchy in accordance with one or more embodiments of the present disclosure. The tree depicted in FIG. 1 is for purposes of example, and any tree structure, or hierarchy, with the same of different number of levels, may be used with embodiments of the present disclosure. The example shown in FIG. 1 uses the example geographical hierarchy discussed above, such that a country is associated with the root node level of tree 100, each city within the country has a corresponding node that stems from the root node in an intermediate level of the tree 100, and each neighborhood has a corresponding leaf node stemming from one of the city nodes in tree 100. A tree, such as tree 100, may also be referred to herein as a geo-tree.

Each node, v, of the tree 100 may have an associated multinomial distribution, $\theta_v$, such that $\theta_v(t)$ represents a probability of observing the tag t at node v. The leaves of the tree 100 represent neighborhoods, but may represent any geographic locale type that represents a spatial unit with a desired level of granularity. A set of nodes along a path from the leaf v to the root of a tree, e.g., tree 100, may be expressed as $R_v$. The parent of a leaf, or node or node leaf, v is a city(v) node, which represents the city to which the neighborhood represented by leaf v belongs, and the parent node of a city(v) node is a node country(v), which represents the country to which the city represented by the city(v) node belongs. As is illustrated in the example of FIG. 1, each neighborhood node v may have a set of tags, which set represents a vocabulary.

In the example shown in FIG. 1, the Country node may correspond to the United States, City A might correspond to San Francisco, City B may correspond to New York City, or Manhattan, Neighborhood A.1 and Neighborhood A.2 may be such neighborhoods as Golden Gate Park and Chinatown, and Neighborhood B.1 might be Chinatown.

In accordance with one or more embodiments, a distribution of probabilities comprising a probability for each element, e.g., tag, of the vocabulary may be determined for each node represented by the geographic mode, e.g., neighborhood. Each such distribution may comprise a multinomial distribution. Each leaf node, e.g., neighborhood, in a geographical hierarchy model may be a random combination of three topics: a general topic corresponding to country(n), a second topic corresponding to city(n) and shared by all its neighborhoods, and the third topic that may be specific to the neighborhood n. These topics may be represented as multinomial distributions associated with the tree nodes that are along the path, $R_v$, from the leaf node v to the root node, e.g., country(v). In the example of FIG. 1, the path, $R_v$, may be expressed as $Root_n = \{n, city(n), country(n)\}$.

In accordance with one or more embodiments, one or more tags identified as being descriptive, or characteristic, of the geographic region may be determined for a corresponding node the geographical hierarchical model. By way of some non-limiting examples, a tag that is associated with a number of nodes at a given level of the tree may be pushed to the next level of the tree. By way of a further non-limiting example, a tag that is associated with a number of neighborhoods within a given city might be pushed up a level so that it is associated with the city in which the neighborhoods are located, and a tag associated with a number of cities within a given country might be pushed up to the country. Conversely, a tag that is associated with a node at a given level more frequently than with other ones of the nodes at that level may be associated with the node rather than the other nodes. In accordance with one or more embodiments, a posterior distribution discussed below may be used to identify the most likely node, relative to other nodes, to which a tag in reality comes from and to which the tag is to be associated in the model.

In accordance with one or more embodiments, the higher a node is in the tree, the more general a topic associated with the node, and a topic associated with a parent node is shared by all its descendants. Using such a scenario, a tag, or topic, associated with the root may be the most general topic and is shared by all nodes of the tree, whereas topics associated with a leaf node of the tree are likely to be more specific to the leaf. A multinomial distribution, or distribution of probabilities or probability distribution, associated with a leaf node associates a higher probability with the tag(s) that are specific to the neighborhood that the tag(s) represent, whereas a distribution at the root associates a high probability that the tags are shared among neighborhoods of different cities. In other words and in a probability distribution associated with a leaf node, a tag associated with the leaf node is likely to have a higher probability than a tag associated with the leaf node's parent or grandparent node. Similarly and in a probability distribution associated with the root node, a tag associated with the root node is likely to have a higher probability than a tag associated with a child node, or grandchild node, of the root node.

In accordance with one or more embodiments, a random mixture of multinomial distributions may be formulated with respect to a latent (hidden) variable z that indicates, for each tag, the level from which it is sampled, or observed. With respect to a tag t, a value of zero, which may be represented as z=0, indicates that the tag t is sampled from the root, or the highest level of the tree, corresponding to the most general distribution, $\theta_{country(n)}$, whereas a value of two, which may be represented as z=2, implies that tag t is sampled from the more specific neighborhood distribution, $\theta_n$. The probability of observing a tag t in neighborhood n may be represented as follows:

$$p(t|n) = \Sigma_{v \in R_n} \theta_v(t) p(v|n) \qquad \text{Expr. (1)}$$

According to expression (1), the distribution of tags in neighborhood n may be a random mixture over a multinomial distribution, which distribution may be represented as $\theta_v$. A multinomial distribution may be associated with each of the nodes along a path from a leaf n to a root of the tree, e.g., tree 100. The log-likelihood of the data, which may be used in generating parameters of the model may be represented as:

$$\log p(x_1, \ldots, x_N) = \Sigma_{n=1}^{N} \Sigma_{t=1}^{M} x_{nt} \log \Sigma_{v \in R_n} \theta_v(t) p(v|n) \qquad \text{Expr. (2)}$$

In accordance with one or more embodiments, the model comprises a multinomial distribution, $\theta_v$, for each node of the geographical hierarchical model and a mixture coefficient, which may be represented as p(v|n). The mixture coefficient may be used in determining an expected proportion of local tags for, e.g., tags considered to be characteristic of, a node n.

Figure 2:
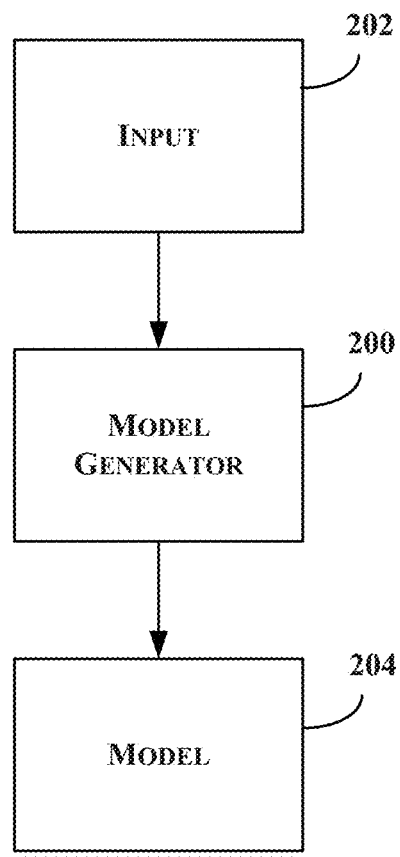

FIG. 2 provides examples of components for use in accordance with one or more embodiments of the present disclosure. A model generator 200 receives input 202 to generate model 204. Input 202 may comprise a set of tags, or other semantic constructs of a vocabulary, and the geographic location(s) associated with each tag. Herein, a tag may be any semantic construct, e.g., such as a word, term, phrase, etc. from a vocabulary. By way of a non-limiting example, input 202 may comprise a set of tags extracted from a set of images, e.g., photos. Each photo has an associated geographic location, e.g., a capture location of the photo identified using GPS coordinates provided by the digital image capture device, camera, smartphone, etc., used to take the photo, and one or more associated tags, e.g., tags from metadata associated with the image.

Input 202 may further include information identifying boundaries for geographic regions, which information may comprise geographic coordinates associated with each boundary of a geographic region. By way of a non-limiting example, a set of geographic coordinates may be used to define each boundary of a neighborhood, city and country. Input 202 may include a definition of the geographic hierarchy, such as and without limitation a hierarchy comprising a neighborhood as the leaf level, city as an intermediate level and country at the root level.

In accordance with one or more embodiments, model 204 comprises parameters such as the multinomial distribution $\theta_v$ associated with each node v of tree 100 and the mixture coefficient p(v|n). By way of a non-limiting example, the model parameters may be learned using expectation-maximization (EM), which iteratively increases the likelihood of the data by updating the model parameters in two phases: an E-phase and an M-phase.

The multinomial distribution $\theta_v$ assigns a probability of zero to a tag not observed in the level associated with the node v. An assumption that may be made is that the distribution $\theta_v$ may be drawn from an exchangeable Dirichlet distribution, which implies that the inferred distribution is a random variable drawn from a posterior distribution conditioned on the observed tags. Over-fitting may be avoided by using another dataset, e.g., a held-out dataset, to determine the mixture coefficients p(v|n). As is discussed in more detail below in connection with FIG. 4, the posterior distribution determined for a given geographic region comprises a probability for each construct, or element, a probability that the element is characteristic of the geographic region.

In accordance with one or more embodiments, in learning the parameters of the model, EM may have, for each iteration, a worst case running time complexity of $\mathcal{O}(\mathcal{N}\,\mathcal{M}\,\mathcal{D})$, where N is the number of leaves of the tree, M is the vocabulary cardinality, e.g., the vocabulary size, such as the number of words, and D is the tree depth, e.g., in the example of FIG. 1, tree 100 has a tree depth of three. The time-complexity of training model 204 may scale linearly with respect to the number of leaves of the tree.

In accordance with one or more embodiments, a geographical hierarchical model may comprise a geographical hierarchical model with adjacency (GHMA), which takes into account an influence on a geographic region, e.g., a neighborhood, of adjacent neighborhoods. In reality, neighborhood boundaries may not be set in stone, and tags characteristic of a neighborhood n may be observed in an adjacent neighborhood n'. Geographic region boundaries may vary. By way of some non-limiting examples, neighborhood boundaries may vary over time and among individuals. By way of a further non-limiting example, a photo may span more than one geographic region, such as in a case that the GPS location of the image capturing device identifies one geographic region and the object(s) depicted in the photo are located in another geographic region.

Using $A_n$ as a set of neighborhoods adjacent to neighborhood n, the probability of observing tag t in neighborhood n may be represented as:

$$p(t|n) = \Sigma_{v \in R_n} \theta_v(t) p(v|n) + \Sigma_{v \in A_n} \theta_v(t) p(v|n) \qquad \text{Expr. (3)}$$

Expression (3) differs from expression (1) in that expression (3) includes the term $\Sigma_{v \in A_n} \theta_v(t) p(v|n)$, which accounts for the possibility of sampling, or observing, tags from nodes $v \in A_n$ representing adjacent neighborhoods. GHMA may be used to quantify the porosity of the frontier between neighborhoods n' and n. The probability p(n'|n) of sampling tags from a distribution of neighborhood n' given neighborhood n may be computed. A high probability p(n'|n) indicates that neighborhood n' has a strong influence on neighborhood because it is very likely to observed tags that are specific to neighborhood n' in neighborhood n.

Model 204 may be used to determine a personality and characteristics of a neighborhood using the tags that describe the neighborhood. Additionally, a neighborhood uniqueness may be quantified using the probability of generating a local tags.

FIG. 3 provides some examples of tags for San Francisco and Manhattan neighborhoods determined in accordance with one or more embodiments of the present disclosure. In the example of FIG. 3, a set of tags is shown for each neighborhood most likely to be observed, and the tags in the set are ranked according to the probability of observing the tags given the neighborhood, e.g. p(t|n). For each of these tags, Bayes' formula may be used to compute the posterior probability p(z|t,n) of the latent variable z, where Z represents the level in the tree, e.g., tree 100, from which the tag was sampled.

FIG. 4 provides an example of tags and associated locality measures corresponding to a node in accordance with one or more embodiments of the present disclosure. In the example of FIG. 4, listing 400 comprises examples of tags associated with a node, and the WOEID, or where on earth identifier, represents a geographic identifier of a given region in a hierarchical representation of the world or a point of interest (POI) identifier, for example. Each tag has an associated locality measure, which may be represented as a probability that the tag is characteristic, or local, to the node. By way of a non-limiting example, the locality measure may be a posterior probability determined using Bayes' formula. Entry 402 of list 400 has a locality measure of 0.985, referenced in FIG. 4 using reference numeral 404, which indicates a high probability that the Las Vegas tag is specifically characteristic or descriptive of, or local to, the node. Conversely, entry 406 of list 400 has a locality measure of 0.045, referenced in FIG. 4 using reference numeral 408, which indicates a low probability that the tag is specifically characteristic/descriptive of, or local to, the node. In other words, the locality measure associated with the sunset tag indicates that the tag is not local, or specific, to the node.

By way of a non-limiting example, a tag observed in neighborhood n is assigned to a neighborhood level where the most likely distribution from which it is sampled is the neighborhood distribution of tags $\theta_n$. Such a tag may be considered to be specifically descriptive of the neighborhood n. A tag's probability may represent an estimated likelihood of the occurrence of the tag in connection with the neighborhood, and may indicate a degree, or level, of aptness, fitness, suitability of the tag to the neighborhood. In the example of FIG. 3, the ten tags listed in each column, where each column represents a different neighborhood, are ranked according to their probability $p(t|n)$, which may correspond to the posterior probability $p(z|t,n)$. The posterior probability associated with each tag may be used to assign the tag to a level of the geographic hierarchical model.

In the example of FIG. 3, ten tags are shown for the Mission and Golden Gate Park neighborhoods of San Francisco and the Battery Park and Midtown neighborhoods of Manhattan. The example of FIG. 3 illustrates that the most frequently-occurring tags observed for a neighborhood may not necessarily specifically describes the neighborhood. By way of a non-limiting example, since the tag California is observed in both the Mission and Golden Gate Park neighborhoods, it might be more characteristic of the city rather than each of the two neighborhoods. As yet another example and with reference to the Battery Park and the Midtown neighborhoods, the tags USA and light are very frequently observed in connection with each neighborhood, but are not considered to be specifically descriptive of either neighborhood. Embodiments of the present disclosure are able to discriminate between a frequent-occurring tag and a characteristic, or descriptive, tag, such frequency of observation of the tag in connection with a neighborhood is less important, if at all, to its selection than the tag's descriptiveness of the neighborhood.

Herein, the phrase specifically descriptive may be used with reference to a tag to indicate that with respect to a geographic region, e.g., neighborhood, the tag is characteristic of the geographic region. Embodiments of the present disclosure identify one or more tags for a geographic region, e.g., a neighborhood, which is/are descriptive of the neighborhood and may not be descriptive of any surrounding neighborhoods.

In the example shown in FIG. 3, the symbol † is associated with tag(s) considered to be specifically descriptive at the country level, the symbol ‡ is associated with tag(s) considered to be specifically descriptive at the city level and the system * is associated with tag(s) considered to be specifically descriptive at the neighborhood level. In the case of the Mission neighborhood, USA is a tag that is considered to be specifically descriptive of the country level, i.e., the United States, California, SF, and Car are tags that are considered to be specifically descriptive of the state of California, and Mission, Graffiti, Art, Mural, Valencia and Food are considered to be specifically descriptive of the Mission neighborhood of San Francisco, Calif., USA.

With reference to the Mission neighborhood, the tags graffiti, art and mural are classified as being specific to the neighborhood, which is not surprising given that the Mission neighborhood is famous for its art scene, unique murals and graffiti. The most probable tags that are specifically descriptive of the Midtown neighborhood of Manhattan includes famous commercial zones such as Rockefeller Center, Times Square and Broadway as well as the Museum of Modern Art (MOMA). The Gotham tag, one of the most observed tags in Battery Park, is assigned to the city level, which is not surprising given that Gotham is one of the nicknames for the city of New York.

Embodiments of the present disclosure may be used to quantify a neighborhood's uniqueness, or alternatively quantifying a lack of uniqueness of a neighborhood that is generic, using the probability of sampling local tags for or tags that are specifically descriptive of, the neighborhood. By way of a non-limiting example, a higher proportion of local tags may indicate a uniqueness of the neighborhood, a unique local character, because the neighborhood has attributes that are not present in other neighborhoods, e.g., other neighborhoods of the same city. Alternatively, a lower proportion of local tags may indicate a lack of uniqueness, or a generic character, of the neighborhood. An expected proportion of local tags for neighborhood n may be captured using the mixture coefficient $p(z=2|n)$, which corresponds to the local distribution. By way of a non-limiting example, unique neighborhoods in San Francisco are Golden Gate Park with a mixture coefficient of 0.7, Presidio with a mixture coefficient of 0.67, Lakeshore with a mixture coefficient of (0.65), and Mission with a mixture coefficient of 0.6. By way of a example, the mixture coefficient of 0.7 indicates a proportion of local tags relative to the number of tags in the collection of tags in the probability distribution is 0.7. By way of a further non-limiting example, assuming a total number of 10 tags in the distribution, a mixture coefficient of 0.7 indicates that 7 of the 10 tags are present for the Golden Gate Park neighborhood that are absent from other neighborhoods, e.g., other neighborhoods in the same city, country, etc.

The mixture coefficients determined for these neighborhoods are reflective of an actual uniqueness of the neighborhoods. Golden Gate Park is the largest urban park in San Francisco, famous for its museums, gardens, lakes, windmills and beaches. The Presidio is a national park and former military base known for its forests, scenic points overlooking the Golden Gate Bridge and the San Francisco Bay area. Lakeshore is known for its beaches, the San Francisco zoo and also for San Francisco State University. Mission is famous for its food, art, unique graffiti, festivals and parades.

Embodiments of the present disclosure may be used to map two or more neighborhoods, e.g., neighborhoods between cities. By way of a non-limiting example, given a neighborhood in San Francisco, a similar neighborhood may be found in Manhattan. A probabilistic framework may be used for the mapping between similar neighborhoods, e.g., neighborhoods in different cities and/or different countries. Recall that each neighborhood n is described by its local distribution $\theta_n$. To compare two neighborhoods n and n', a cosine similarity may be determined between their local distributions $\theta_n$ and $\theta_{n'}$, as follows:

$$sim(n, n') = \frac{\sum_{t=1}^{M} \theta_n(t)\theta_{n'}(t)}{\sqrt{\sum_{t=1}^{M} \theta_n(t)^2} \sqrt{\sum_{t=1}^{M} \theta_{n'}(t)^2}} \quad \text{Expr. (4)}$$

In expression (4), the similarity range may be [0,1], where sim(n,n')=1 indicates that the local distributions of the two neighborhoods are the same, e.g., $\theta_n = \theta_{n'}$. In accordance with such a similarity range, a similarity range determined for a pair of geographic regions may be 0, 1 or some value in between.

FIG. 5 provides examples of San Francisco neighborhoods and a respective most similar neighborhood for each in Manhattan in accordance with one or more embodiments of the present disclosure. The table shown in FIG. 5, maps a neighborhood in San Francisco with its most similar neighborhood in Manhattan, and parenthetically shows a similarity measure, e.g., 0.23 determined for Mission and East Village. Additionally, the table lists some of the top common tags, e.g., tags shared by the two similar neighborhoods.

By way of a non-limiting example, the common tags may be obtained by ranking the tags according to the product of the tag probabilities, e.g., $\theta_n(t)\theta_{n'}(t)$. In cases where the similarity measures were close, more than one neighborhood in Manhattan is mapped to a San Francisco neighborhood. By way of a non-limiting example, Washington Heights and the Upper West Side have close similarity measures of 0.26 and 0.22 (respectively) with respect to the Golden Gate Park neighborhood, and are both mapped to the Golden Gate Park neighborhood. With respect to the East Village neighborhood of Manhattan and the Mission neighborhood in San Francisco, some of the characteristics that they share include graffiti/murals, food, restaurants and bars. While there are many differences between San Francisco and Manhattan, their Chinatown neighborhoods are mapped to each other and exhibit very similar distribution of local tags, e.g., cosine similarity of 0.85. Additionally, is not surprising that Treasure island, e.g., an artificial island in San Francisco Bay, is mapped to Roosevelt Island in Manhattan.

Temporality, e.g., time of day, may cause a change in character of a neighborhood. By way of a non-limiting example, a neighborhood may have one character during the day and another at night.

Figure 6:
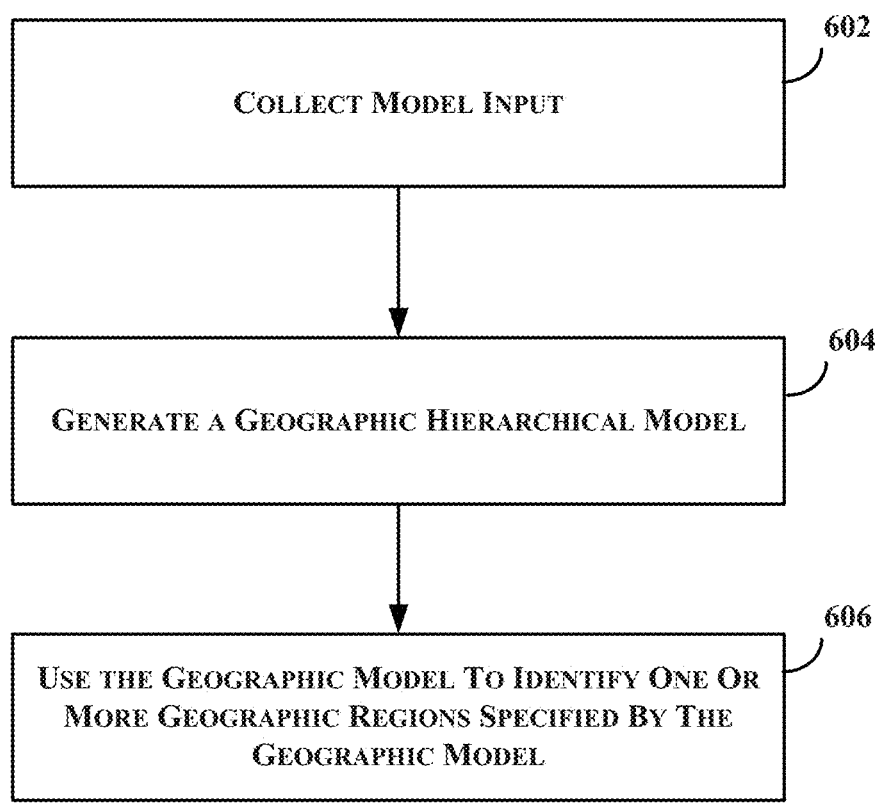

FIG. 6 provides a process flow example in accordance with one or more embodiments of the present disclosure. The process flow may be performed by one or more computing devices, and or one or more processing units of one or more computing devices.

At step 602, model input is collected. The model input may be the input 202. By way of a non-limiting example, the model input may comprise a set of photographs from one or more online social media sites, e.g., Flickr™. At step 604 a model is generated. Step 604 may be performed using model generator 200, for example. The model may comprise a plurality of probability distributions and mixture coefficients. Each probability distribution $\theta_v$ of the plurality corresponding to a geographic region of a plurality of geographic regions. A geographic region's probability distribution comprising, for each vocabulary construct, e.g., a tag, of a plurality of tags, a probability that the tag is descriptive of the geographic region. The probability may identify a tag's descriptiveness of the geographic region.

At step 606, at least some of the plurality of probability distributions may be used to identify at least one geographic region of a plurality of geographic regions for a response to a received request.

By way of a non-limiting example, the request may be a request to identify two or more similar geographic regions. One or more pairs of probability distributions may be compared to identify a similarity between a pair of geographic regions as the two similar geographic regions. A similarity may be determined using expression (4), for example. A request might be a request to identify a geographic region with a unique local character, and at least some of the probability distributions may be examined to identify a geographic region with unique local character. Relative to other geographic regions, a geographic region with unique local character may be one that has a higher proportion of local tags identified using its probability distribution.

As yet some other non-limiting examples, a request may comprise a request to identify a geographic region associated with a content item. For example, a photograph that has a number of associated tags may be used identify a location at which the photograph was taken. Each of a number of the probability distributions might be compared with the content item's associated tags to identify the geographic region associated with the content item.

As yet another example, an object depicted in a content item might be identified using the identified geographic region. For example, embodiments of the present disclosure may be used with an image processing system which processes an image to make a prediction concerning the contents of the image, such as identifying the object(s) depicted in the image information, such as tags, associated with the image may be used to identify a geographic region of the object(s) depicted in the image. The identified geographic region, or location, of the objects depicted in the image may be used as feedback regarding the image processing system's prediction(s), such as reinforcing the prediction(s) reached by the image processing system, or alternatively indicating that the prediction(s) is/are inaccurate.

As yet a further non-limiting example, a request may comprise a request to identify a locality, location, etc. in connection with a search comprising at least one search term. A number of the probability distributions might be compared with the at least one search term to identify a geographic region as the locality of the search.

By way of some further non-limiting examples, in a geographic region hierarchy formed using a number of geographic regions, at least one tag from a vocabulary of tags may be identified, which identified tag is shared by a number of nodes at a child level of the geographic hierarchy. Such a tag may be associated with a parent geographic region of the children geographic regions. As yet another example and in a geographic region hierarchy formed using a number of geographic regions, at least one tag from a vocabulary of tags may be identified as being unique to a child node, and such a tag may be identified as belonging to the child node.

Figure 7:
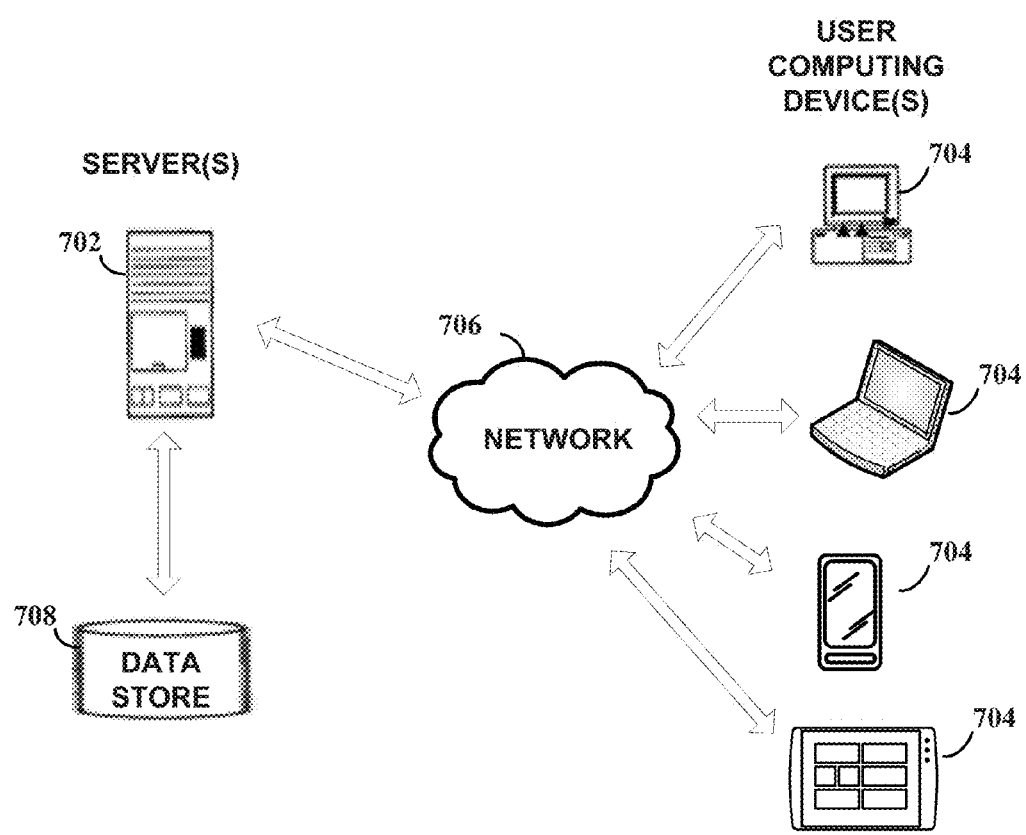
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 702 can be configured to execute program code, instructions, etc. to provide functionality in accordance with one or more embodiments of the present disclosure.

Computing device 702 can serve content to user computing devices 704 using a browser application via a network 706. Data store 708 can be used to store program code to configure a server 702 to functionality in accordance with one or more embodiments of the present disclosure.

The user computing device 704 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computing device 704 can include one or more processors, memory, a removable media reader, network interface, display and interface, and one or more input devices, e.g., keyboard, keypad, mouse, etc. and input device interface, for example. One skilled in the art will recognize that server 702 and user computing device 704 may be configured in many different ways and implemented using many different combinations of hardware, software, or firmware.

In accordance with one or more embodiments, a computing device 702 can make a user interface available to a user computing device 704 via the network 706. The user interface made available to the user computing device 704 can include content items, or identifiers (e.g., URLs) selected for the user interface in accordance with one or more embodiments of the present invention. In accordance with one or more embodiments, computing device 702 makes a user interface available to a user computing device 704 by communicating a definition of the user interface to the user computing device 704 via the network 706. The user interface definition can be specified using any of a number of languages, including without limitation a markup language such as Hypertext Markup Language, scripts, applets and the like. The user interface definition can be processed by an application executing on the user computing device 704, such as a browser application, to output the user interface on a display coupled, e.g., a display directly or indirectly connected, to the user computing device 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 7. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 8:
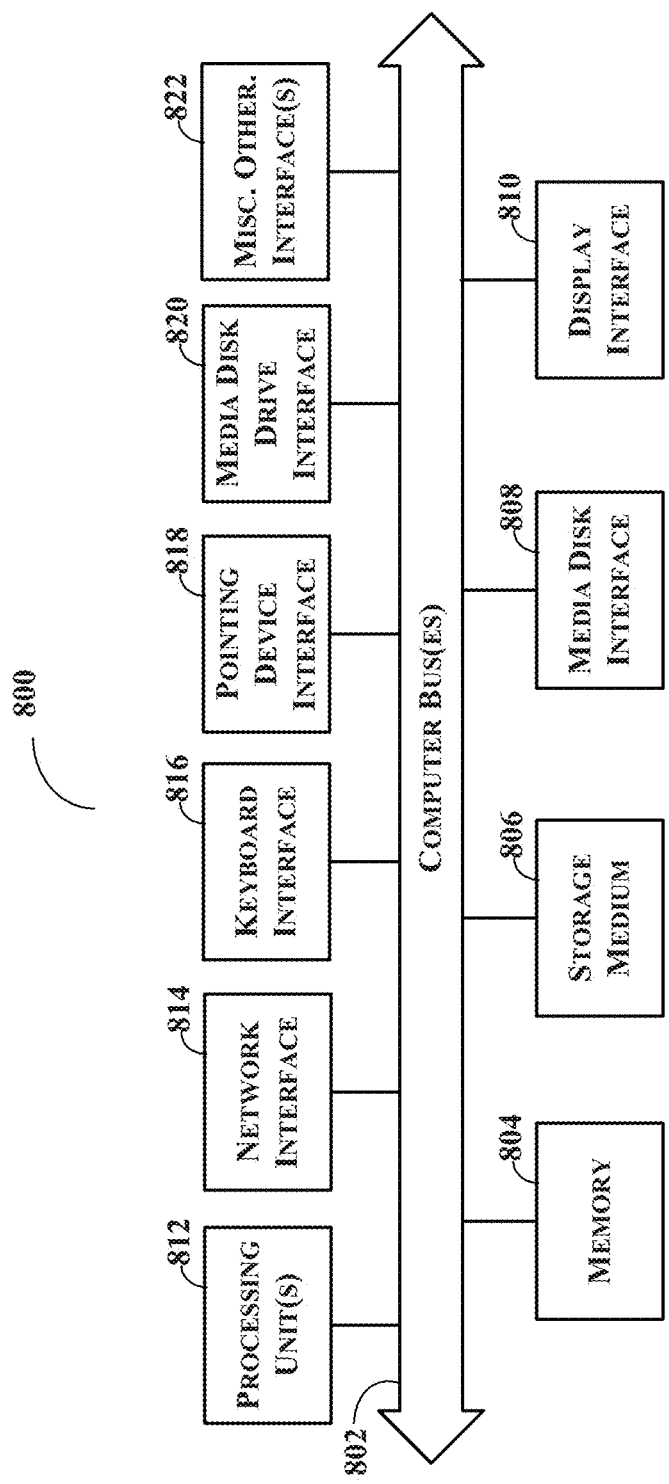
FIG. 8 is a detailed block diagram illustrating an internal architecture of a computing device in accordance with one or more embodiments of the present disclosure.

FIG. 8 is a detailed block diagram illustrating an internal architecture of a computing device, e.g., a computing device such as server 702 or user computing device 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 820 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
obtaining, by a processing unit of a search system, data comprising a plurality of tags and geographic location information associated with each tag of the plurality of tags, the geographic location information associated with a tag, of the plurality of tags, identifying a geographic location that is a part of a geographic region, the geographic region is one of a plurality of geographic regions, each geographic region is associated with a level of a geographic region hierarchy, the geographic region hierarchy comprising a plurality of levels, each child level of the geographic region hierarchy has a corresponding parent level of the geographic region hierarchy, the geographic region associated with the child level is a part of the geographic region associated with the corresponding parent level;

determining, by the processing unit and using the obtained data, a plurality of probability distributions corresponding to the plurality of geographic regions, the determining comprising determining a probability distribution for each geographic region of the plurality of geographic regions, each geographic region's probability distribution comprising a numeric locality measure, for each tag of the plurality of tags, each numeric locality measure is associated with a tag, of the plurality of tags, and a geographic region, of the plurality of geographic regions, and specifies a probability that the associated tag is descriptive of the associated geographic region;

assigning, by the processing unit and to a geographic region of the plurality of geographic regions, a number of tags, of the plurality of tags, the assigning using the probability distribution, of the plurality of probability distributions, corresponding to the geographic region, each tag of the number of tags assigned to the geographic region having a numeric locality measure indicating that the tag is descriptive of the geographic region;

receiving, by the processing unit, a request to identify at least one geographic region of the plurality of geographic regions; and using, by the processing unit, at least some of the plurality of probability distributions, each of which specifying, for each tag of the plurality, the numeric locality measure determined for the tag and indicating the probability that the tag is descriptive of a geographic region of the plurality of geographic regions, to identify the at least one geographic region of the plurality for a response to the request.

2. The method of claim 1, further comprising:
determining, by the processing unit and in the geographic region hierarchy formed using the plurality of geographic regions, at least one tag of the plurality of tags that is shared by a number of nodes at the child level of the geographic hierarchy, the number of nodes at the child level having a common node at the parent level of the geographic hierarchy; and
assigning, by the processing unit, the at least one tag of the plurality of tags to the common node at the parent level of the geographic hierarchy.

3. The method of claim 1, further comprising:
determining, by the processing unit and in the geographic region hierarchy formed using the plurality of geographic regions, at least one tag of the plurality of tags that is unique to the child node of a number of child nodes at a respective level of the geographic hierarchy; and
identifying, by the processing unit, the at least one tag of the plurality of tags as belonging to the child node.

4. The method of claim 1:
the receiving further comprising receiving a request to identify two similar geographic regions; and
the using further comprising comparing at least one pair of probability distributions of the at least some probability distributions to identify a similarity between a pair of geographic regions as the two similar geographic regions.

5. The method of claim 4, the comparing further comprising:

determining, for each pair of the at least one probability distribution pair, a cosine similarity between the pair.

6. The method of claim 1:
the receiving further comprising receiving a request to identify a geographic region of the plurality with unique local character; and
the using further comprising examining the at least some of the plurality of probability distributions to identify the geographic region of the plurality with unique local character, relative to other geographic regions of the plurality, the geographic region with unique local character having a higher proportion of local tags identified using its probability distribution.

7. The method of claim 6, the examining further comprising:
determining, for each geographic region corresponding to a probability distribution of the at least some of the plurality of probability distributions, a proportion of local tags using a mixture coefficient.

8. The method of claim 1:
the receiving further comprising receiving a request to identify a geographic region associated with a content item, the content item having one or more associated tags; and
the using further comprising comparing each probability distribution of the at least some of the plurality of probability distributions with the content item's associated tags to identify the geographic region associated with the content item.

9. The method of claim 8, further comprising:
identifying the geographic region associated with the content item using the identified geographic region's probability distribution identifying one or more tags local to the geographic region and the one or more tags associated with the content item.

10. The method of claim 9, further comprising:
identifying an object depicted in the content item using the identified geographic region.

11. The method of claim 1:
the receiving further comprising receiving a request to identify a locality in connection with a search comprising at least one search term; and
the using further comprising comparing each probability distribution of the at least some of the plurality of probability distributions with the at least one search term to identify a geographic region as the locality of the search.

12. The method of claim 1, wherein the probability that the tag is descriptive of the geographic region represents an estimated likelihood of the tag being used in a description of the region.

13. The method of claim 1:
the receiving further comprising receiving a request to identify a geographic region of the plurality having a generic local character relative to other geographic regions of the plurality; and
the using further comprising examining the at least some of the plurality of probability distributions to identify the geographic region of the plurality with a greater generic local character, relative to other geographic regions of the plurality, the geographic region with the greater generic character having a lesser proportion of local tags identified using its probability distribution.

14. The method of claim 1, the geographic region hierarchy accounts for a mutual influence occurring among two or more geographic regions sharing common boundaries.

15. The method of claim 1:
the receiving further comprising receiving the request to identify a geographic region of the plurality for use in determining a level of confidence in an image recognition result for an image; and
the using further comprising examining the at least some of the plurality of probability distributions to identify the geographic region of the plurality as a likely location of an object depicted in the image.

16. A search system comprising:
at least one computing device, each computing device comprising a processor and a storage medium for tangibly storing thereon program logic for execution by the processor, the stored program logic comprising:
  obtaining logic executed by the processor for obtaining data comprising a plurality of tags and geographic location information associated with each tag of the plurality of tags, the geographic location information associated with a tag, of the plurality of tags, identifying a geographic location that is a part of a geographic region, the geographic region is one of a plurality of geographic regions, each geographic region is associated with a level of a geographic region hierarchy, the geographic region hierarchy comprising a plurality of levels, each child level of the geographic region hierarchy has a corresponding parent level of the geographic region hierarchy, the geographic region associated with the child level is a part of the geographic region associated with the corresponding parent level;
  determining logic executed by the processor for determining, using the obtained data, a plurality of probability distributions, the determining comprising determining a probability distribution for each geographic region of the plurality of geographic regions, each geographic region's probability distribution comprising a numeric locality measure, for each tag of the plurality of tags, each numeric locality measure is associated with a tag, of the plurality of tags, and a geographic region, of the plurality of geographic regions, and specifies a probability that the associated tag is descriptive of the associated geographic region;
  assigning logic executed by the processor for assigning, to a geographic region of the plurality of geographic regions, a number of tags, of the plurality of tags, the assigning using the probability distribution, of the plurality of probability distributions, corresponding to the geographic region, each tag of the number of tags assigned to the geographic region having a numeric locality measure indicating that the tag is descriptive of the geographic region;
  receiving logic executed by the processor for receiving a request to identify at least one geographic region of the plurality of geographic regions; and
  using logic executed by the processor for using at least some of the plurality of probability distributions, each of which specifying, for each tag of the plurality, the numeric locality measure determined for the tag and indicating the probability that the tag is descriptive of a geographic region of the plurality of geographic regions, to identify the at least one geographic region of the plurality for a response to the request.

17. The system of claim 16, the stored program logic further comprising:
  determining logic executed by the processor for determining, in the geographic region hierarchy formed using the plurality of geographic regions, at least one tag of the plurality of tags that is shared by a number of nodes at the child level of the geographic hierarchy, the number of nodes at the child level having a common node at the parent level of the geographic hierarchy; and
  assigning logic executed by the processor for assigning the at least one tag of the plurality of tags to the common node at the parent level of the geographic hierarchy.

18. The system of claim 16, the stored program logic further comprising:
  determining logic executed by the processor for determining, in the geographic region hierarchy formed using the plurality of geographic regions, at least one tag of the plurality of tags that is unique to the child node of a number of child nodes at a respective level of the geographic hierarchy; and
  identifying logic executed by the processor for identifying the at least one tag of the plurality of tags as belonging to the child node.

19. The system of claim 16:
the receiving logic further comprising receiving logic executed by the processor for receiving a request to identify two similar geographic regions; and
the using logic executed by the processor for using further comprising instructions to compare at least one pair of probability distributions of the at least some probability distributions to identify a similarity between a pair of geographic regions as the two similar geographic regions.

20. The system of claim 19, the comparing logic further comprising:
  determining logic executed by the processor for determining, for each pair of the at least one probability distribution pair, a cosine similarity between the pair.

21. The system of claim 16:
the receiving logic further comprising receiving logic executed by the processor for receiving a request to identify a geographic region of the plurality with unique local character; and
the using logic executed by the processor for using further comprising instructions to examine the at least some of the plurality of probability distributions to identify the geographic region of the plurality with unique local character, relative to other geographic regions of the plurality, the geographic region with unique local character having a higher proportion of local tags identified using its probability distribution.

22. The system of claim 21, the examining logic further comprising:
  determining logic executed by the processor for determining, for each geographic region corresponding to a probability distribution of the at least some of the plurality of probability distributions, a proportion of local tags using a mixture coefficient.

23. The system of claim 16:
the receiving logic further comprising receiving logic executed by the processor for receiving a request to identify a geographic region associated with a content item, the content item having one or more associated tags; and
the using logic further comprising comparing logic executed by the processor for comparing each probability distribution of the at least some of the plurality of probability distributions with the content item's associated tags to identify the geographic region associated with the content item.

24. The system of claim 23, further comprising:
identifying logic executed by the processor for identifying the geographic region associated with the content item using the identified geographic region's probability distribution identifying one or more tags local to the geographic region and the one or more tags associated with the content item.

25. The system of claim 24, further comprising:
identifying logic executed by the processor for identifying an object depicted in the content item using the identified geographic region.

26. The system of claim 16:
the receiving logic further comprising receiving logic executed by the processor for receiving a request to identify a locality in connection with a search comprising at least one search term; and
the using logic further comprising comparing logic executed by the processor for comparing each probability distribution of the at least some of the plurality of probability distributions with the at least one search term to identify a geographic region as the locality of the search.

27. The system of claim 16, wherein the probability that the tag is descriptive of the geographic region represents an estimated likelihood of the tag being used in a description of the region.

28. The system of claim 16:
the receiving logic further comprising receiving logic executed by the processor for receiving a request to identify a geographic region of the plurality having a generic local character relative to other geographic regions of the plurality; and
the using logic further comprising examining logic executed by the processor for examining the at least some of the plurality of probability distributions to identify the geographic region of the plurality with a greater generic local character, relative to other geographic regions of the plurality, the geographic region with the greater generic character having a lesser proportion of local tags identified using its probability distribution.

29. The system of claim 16, the geographic region hierarchy accounts for a mutual influence occurring among two or more geographic regions sharing common boundaries.

30. The system of claim 16:
the receiving logic further comprising receiving logic executed by the processor for receiving the request to identify a geographic region of the plurality for use in determining a level of confidence in an image recognition result for an image; and
the using logic further comprising examining logic executed by the processor for examining the at least some of the plurality of probability distributions to identify the geographic region of the plurality as a likely location of an object depicted in the image.

31. A computer readable non-transitory storage medium for tangibly storing thereon computer readable instructions that when executed cause at least one processor of a search system to:
obtain data comprising a plurality of tags and geographic location information associated with each tag of the plurality of tags, the geographic location information associated with a tag, of the plurality of tags, identifying a geographic location that is a part of a geographic region, the geographic region is one of a plurality of geographic regions, each geographic region is associated with a level of a geographic region hierarchy, the geographic region hierarchy comprising a plurality of levels, each child level of the geographic region hierarchy has a corresponding parent level of the geographic region hierarchy, the geographic region associated with the child level is a part of the geographic region associated with the corresponding parent level;
determine, using the obtained data, a plurality of probability distributions corresponding to the plurality of geographic regions, the determining comprising determining a probability distribution for each geographic region of the plurality of geographic regions, geographic region's probability distribution comprising a numeric locality measure, for each tag of the plurality of tags, each numeric locality measure is associated with a tag, of the plurality of tags, and a geographic region, of the plurality of geographic regions, and specifies a probability that the associated tag is descriptive of the associated geographic region;
assigning, by the processing unit and to a geographic region of the plurality of geographic regions, a number of tags, of the plurality of tags, the assigning using the probability distribution, of the plurality of probability distributions, corresponding to the geographic region, each tag of the number of tags assigned to the geographic region having a numeric locality measure indicating that the tag is descriptive of the geographic region;
receive a request to identify at least one geographic region of the plurality of geographic regions; and
use at least some of the plurality of probability distributions, each of which specifying, for each tag of the plurality, the numeric locating measure determined for the tag and indicating the probability that the tag is descriptive of a geographic region of the plurality of geographic regions, to identify the at least one geographic region of the plurality for a response to the request.

32. The computer readable non-transitory storage medium of claim 31, the instructions further comprising instructions to:
determine, in the geographic region hierarchy formed using the plurality of geographic regions, at least one tag of the plurality of tags that is shared by a number of nodes at the child level of the geographic hierarchy, the number of nodes at the child level having a common node at the parent level of the geographic hierarchy; and
assign the at least one tag of the plurality of tags to the common node at the parent level of the geographic hierarchy.

33. The computer readable non-transitory storage medium of claim 31, the instructions further comprising instructions to:
determine, in the geographic region hierarchy formed using the plurality of geographic regions, at least one tag of the plurality of tags that is unique to the child node of a number of child nodes at a respective level of the geographic hierarchy; and
identify the at least one tag of the plurality of tags as belonging to the child node.

34. The computer readable non-transitory storage medium of claim 31:

the instructions to receive further comprising instructions to receive a request to identify two similar geographic regions; and the instructions to use further comprising instructions to compare at least one pair of probability distributions of the at least some probability distributions to identify a similarity between a pair of geographic regions as the two similar geographic regions.

35. The computer readable non-transitory storage medium of claim 34, the instructions to compare further comprising instructions to:

determine, for each pair of the at least one probability distribution pair, a cosine similarity between the pair.

36. The computer readable non-transitory storage medium of claim 31:

the instructions to receive further comprising instructions to receive a request to identify a geographic region of the plurality with unique local character; and the instructions to use further comprising instructions to examine the at least some of the plurality of probability distributions to identify the geographic region of the plurality with unique local character, relative to other geographic regions of the plurality, the geographic region with unique local character having a higher proportion of local tags identified using its probability distribution.

37. The computer readable non-transitory storage medium of claim 36, the instructions to examine further comprising instructions to:

determine, for each geographic region corresponding to a probability distribution of the at least some of the plurality of probability distributions, a proportion of local tags using a mixture coefficient.

38. The computer readable non-transitory storage medium of claim 31:

the instructions to receive further comprising instructions to receive a request to identify a geographic region associated with a content item, the content item having one or more associated tags; and the instructions to use further comprising instructions to compare each probability distribution of the at least some of the plurality of probability distributions with the content item's associated tags to identify the geographic region associated with the content item.

39. The computer readable non-transitory storage medium of claim 38, further comprising instructions to:

identify the geographic region associated with the content item using the identified geographic region's probability distribution identifying one or more tags local to the geographic region and the one or more tags associated with the content item.

40. The computer readable non-transitory storage medium of claim 39, further comprising instructions to:

identify an object depicted in the content item using the identified geographic region.

41. The computer readable non-transitory storage medium of claim 31:

the instructions to receive further comprising instructions to receive a request to identify a locality in connection with a search comprising at least one search term; and the instructions to use further comprising instructions to compare each probability distribution of the at least some of the plurality of probability distributions with the at least one search term to identify a geographic region as the locality of the search.

42. The computer readable non-transitory storage medium of claim 31, wherein the probability that the tag is descriptive of the geographic region represents an estimated likelihood of the tag being used in a description of the region.

43. The computer readable non-transitory storage medium of claim 31, wherein the probability that the tag is descriptive of the geographic region represents an estimated likelihood of the tag being used in a description of the region.

44. The computer readable non-transitory storage medium of claim 31:

the instructions to receive further comprising instructions to receive a request to identify a geographic region of the plurality having a generic local character relative to other geographic regions of the plurality; and the instructions to use further comprising instructions to examine the at least some of the plurality of probability distributions to identify the geographic region of the plurality with a greater generic local character, relative to other geographic regions of the plurality, the geographic region with the greater generic character having a lesser proportion of local tags identified using its probability distribution.

45. The computer readable non-transitory storage medium of claim 31, the geographic region hierarchy accounts for a mutual influence occurring among two or more geographic regions sharing common boundaries.

46. The computer readable non-transitory storage medium of claim 31:

the instructions to receive further comprising instructions to receive the request to identify a geographic region of the plurality for use in determining a level of confidence in an image recognition result for an image; and the instructions to use further comprising instructions to examine the at least some of the plurality of probability distributions to identify the geographic region of the plurality as a likely location of an object depicted in the image.

* * * * *